US009237812B1

(12) United States Patent
Cordell et al.

(10) Patent No.: US 9,237,812 B1
(45) Date of Patent: Jan. 19, 2016

(54) BODILY CUSHION ASSEMBLY

(71) Applicants: Lena Cordell, Strunk, KY (US); David Cordell, Strunk, KY (US)

(72) Inventors: Lena Cordell, Strunk, KY (US); David Cordell, Strunk, KY (US)

( * ) Notice: Subject to any disclaimer, the term of this patent is extended or adjusted under 35 U.S.C. 154(b) by 0 days.

(21) Appl. No.: 14/450,477

(22) Filed: Aug. 4, 2014

(51) Int. Cl.
*A47C 31/00* (2006.01)
*A47C 7/62* (2006.01)
*A47C 31/11* (2006.01)
*B60N 2/28* (2006.01)

(52) U.S. Cl.
CPC . *A47C 7/62* (2013.01); *A47C 31/11* (2013.01); *B60N 2/2881* (2013.01)

(58) Field of Classification Search
CPC ......... B60N 2/2881; A47C 7/62; A47C 31/11
USPC ............... 297/219.12, 230.13, 256.15, 219.1, 297/225, 227, 228
See application file for complete search history.

(56) References Cited

U.S. PATENT DOCUMENTS

| | | | | |
|---|---|---|---|---|
| 2,644,173 A * | 7/1953 | James | | 5/425 |
| 4,607,402 A | 8/1986 | Pollard | | |
| 4,712,258 A * | 12/1987 | Eves | | 5/424 |
| D300,694 S | 4/1989 | Krok | | |
| 5,056,533 A | 10/1991 | Solano | | |
| 5,310,245 A * | 5/1994 | Lyszczasz | | 297/219.12 |
| 5,351,348 A * | 10/1994 | Beger | | 5/420 |
| 5,359,739 A * | 11/1994 | Rains et al. | | 5/81.1 R |
| 5,615,927 A | 4/1997 | Kassai | | |
| D393,772 S | 4/1998 | Vingino | | |
| 5,754,998 A | 5/1998 | Selton | | |
| 5,826,287 A * | 10/1998 | Tandrup | | 5/655 |
| 5,956,787 A | 9/1999 | James et al. | | |
| 6,363,558 B1 * | 4/2002 | Dunne | | 5/655 |
| 6,393,639 B1 * | 5/2002 | Ohsner | | A47D 5/006 5/424 |
| 6,467,840 B1 * | 10/2002 | Verbovszky et al. | | 297/219.12 |
| 7,097,243 B2 * | 8/2006 | Verbovszky | | 297/219.12 |
| 7,311,357 B2 | 12/2007 | Gold et al. | | |
| D670,122 S * | 11/2012 | Childress | | D6/601 |
| 8,419,128 B1 * | 4/2013 | Leach | | 297/219.12 |
| 2006/0031992 A1 * | 2/2006 | Moore | | 5/630 |
| 2011/0031790 A1 * | 2/2011 | Smith, Sr. | | A47C 7/42 297/230.12 |

FOREIGN PATENT DOCUMENTS

JP 07246134 A 9/1995
KR 2002686619 3/2002

* cited by examiner

*Primary Examiner* — Chi Q Nguyen

(57) ABSTRACT

A bodily cushion assembly for retaining a user's arms and legs within a chair such that said assembly prevents bruising from occurring on the user's arms and legs includes a pad that may be positionable on a chair. The user sits on the pad after the pad is positioned on the chair. A plurality of bolsters is coupled to an outer edge of the pad. The plurality of bolsters retains the user's arms and legs on the pad.

7 Claims, 5 Drawing Sheets

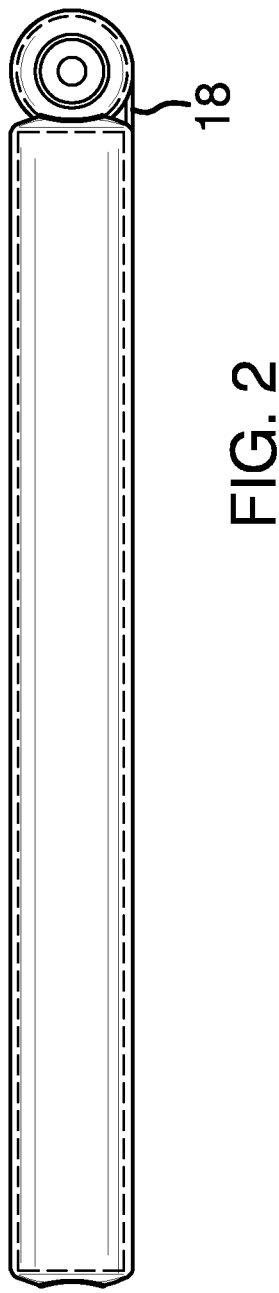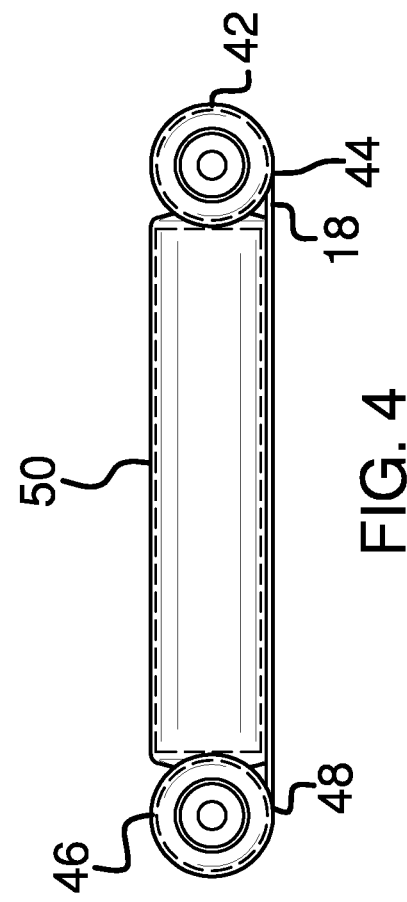

BODILY CUSHION ASSEMBLY

BACKGROUND OF THE DISCLOSURE

Field of the Disclosure

The disclosure relates to cushion devices and more particularly pertains to a new cushion device for retaining a user's arms and legs within a chair such that said assembly prevents bruising from occurring on the user's arms and legs.

SUMMARY OF THE DISCLOSURE

An embodiment of the disclosure meets the needs presented above by generally comprising a pad that may be positionable on a chair. The user sits on the pad after the pad is positioned on the chair. A plurality of bolsters is coupled to an outer edge of the pad. The plurality of bolsters retains the user's arms and legs on the pad.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 4 is a front view of an embodiment of the disclosure.

DESCRIPTION OF THE PREFERRED EMBODIMENT

Figure 1:
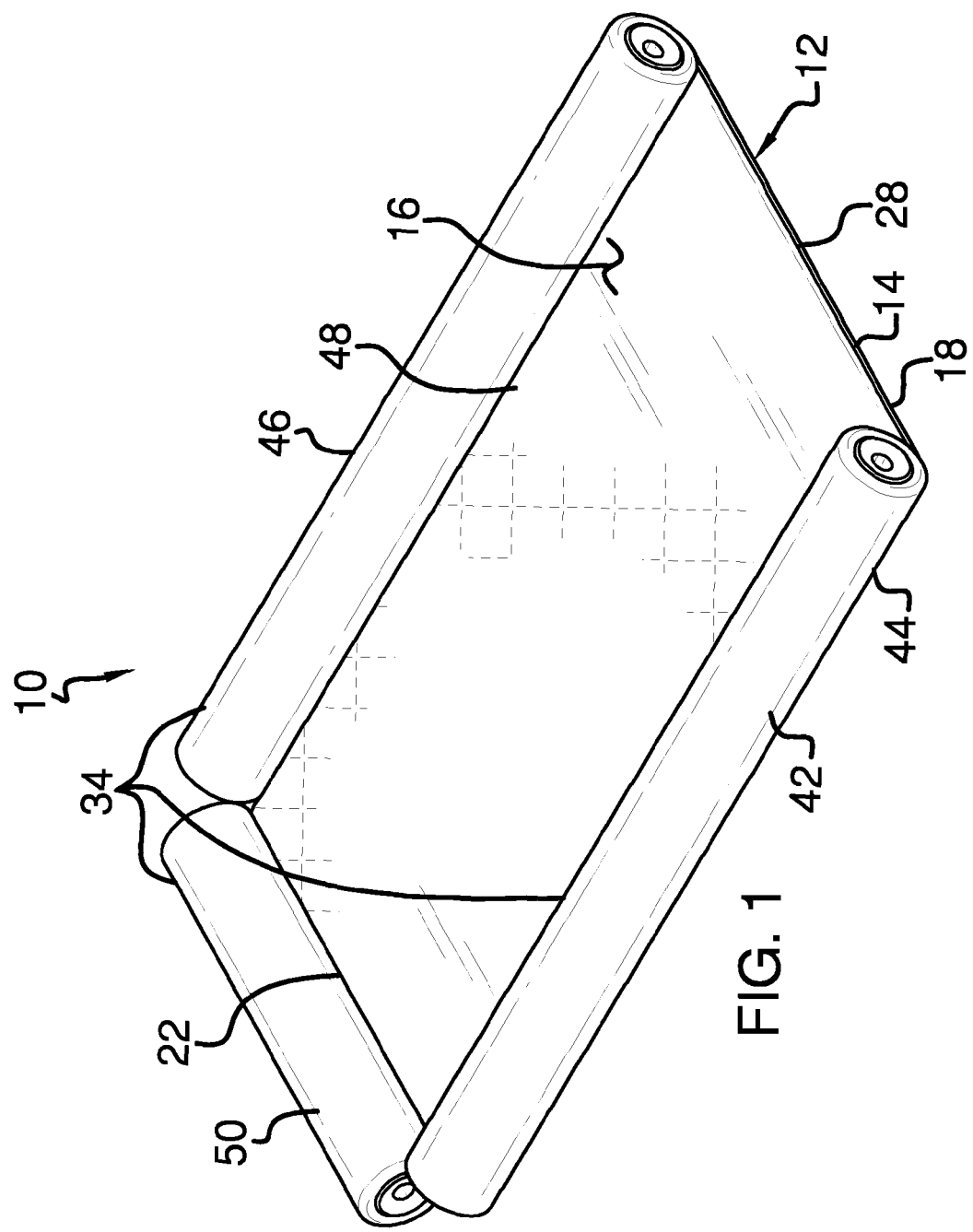
FIG. 1 is a perspective view of a bodily cushion assembly according to an embodiment of the disclosure.
Figure 3:
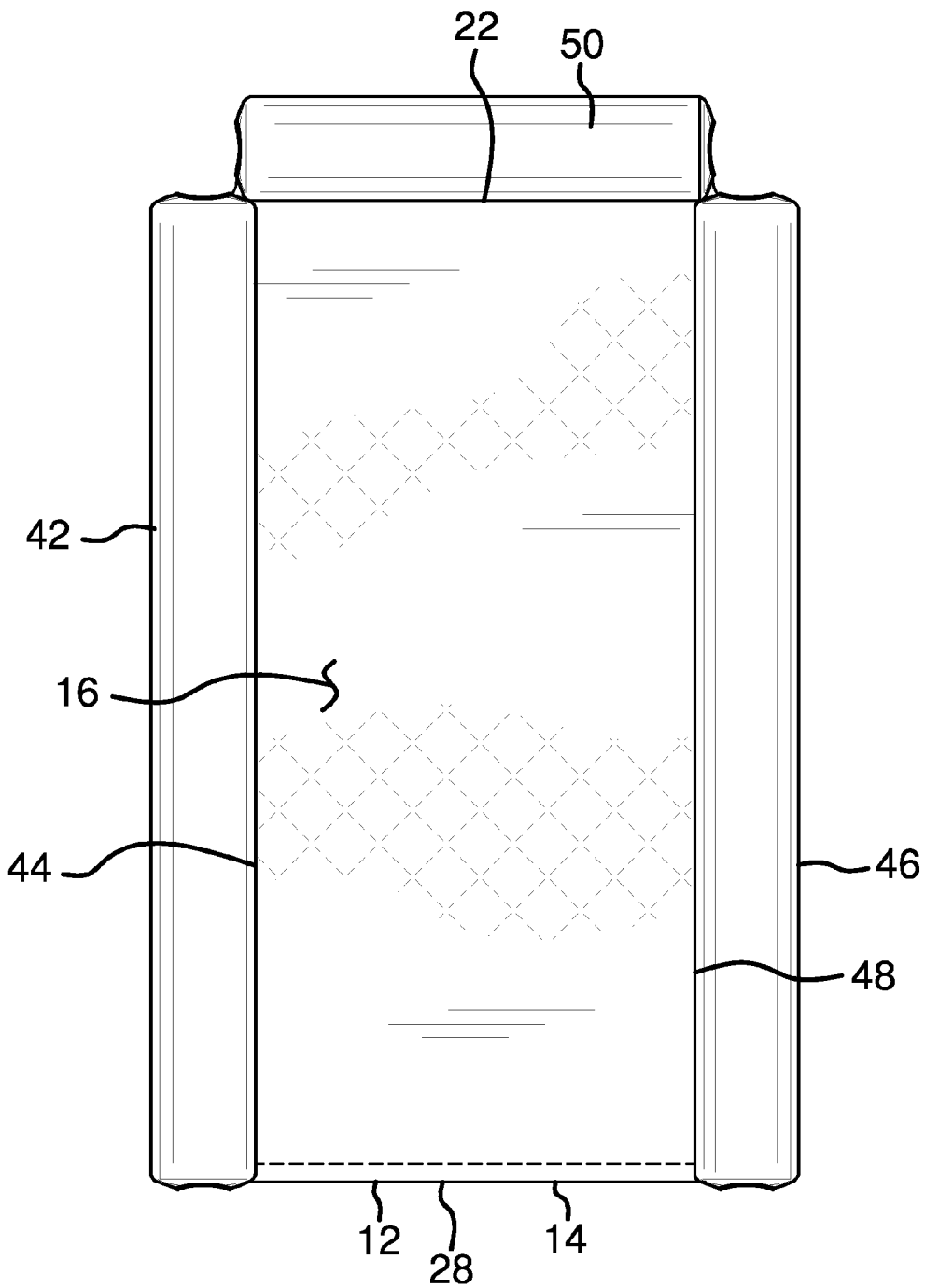
FIG. 3 is a top view of an embodiment of the disclosure.
Figure 5:
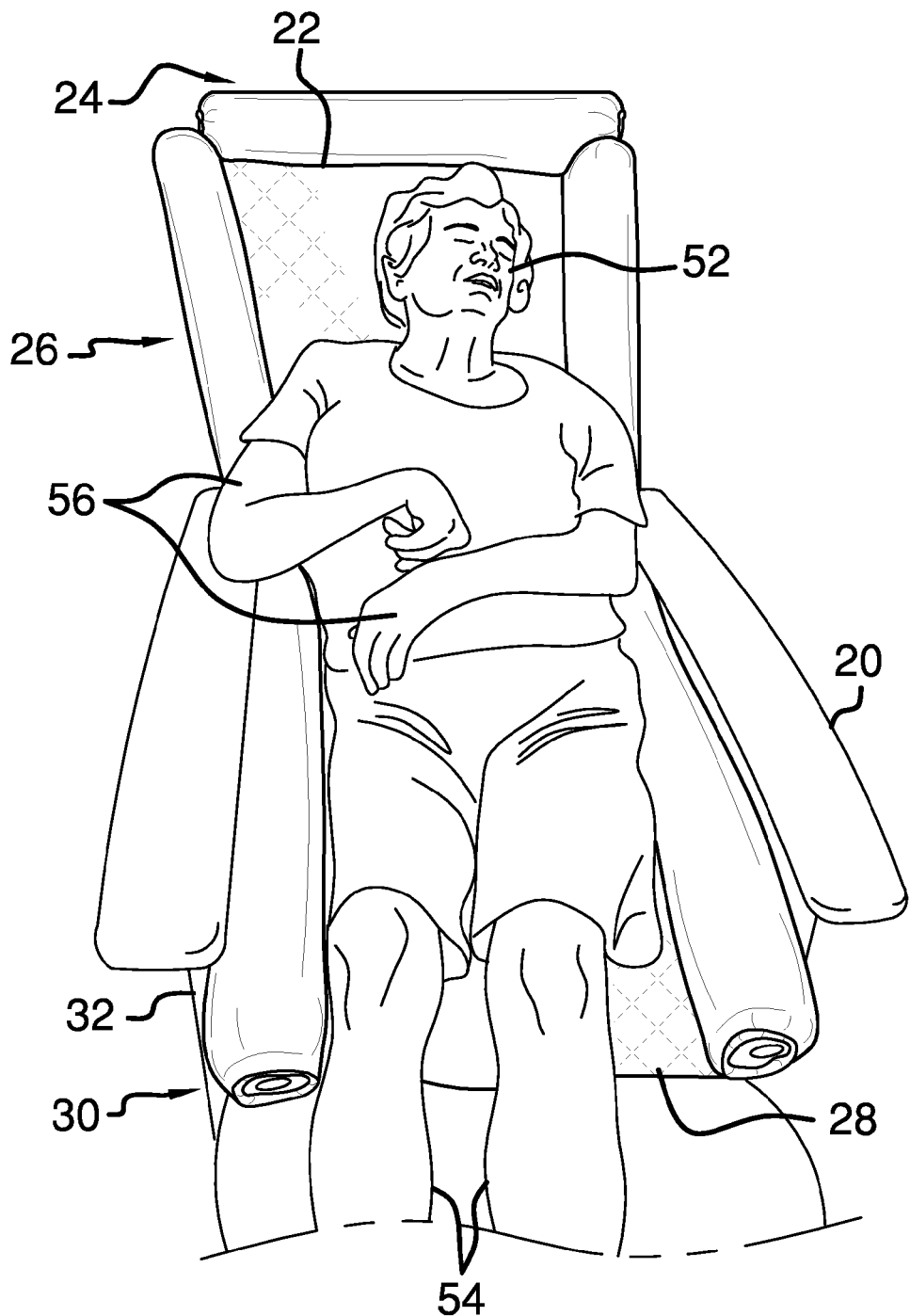
FIG. 5 is an in-use view of an embodiment of the disclosure.
Figure 6:
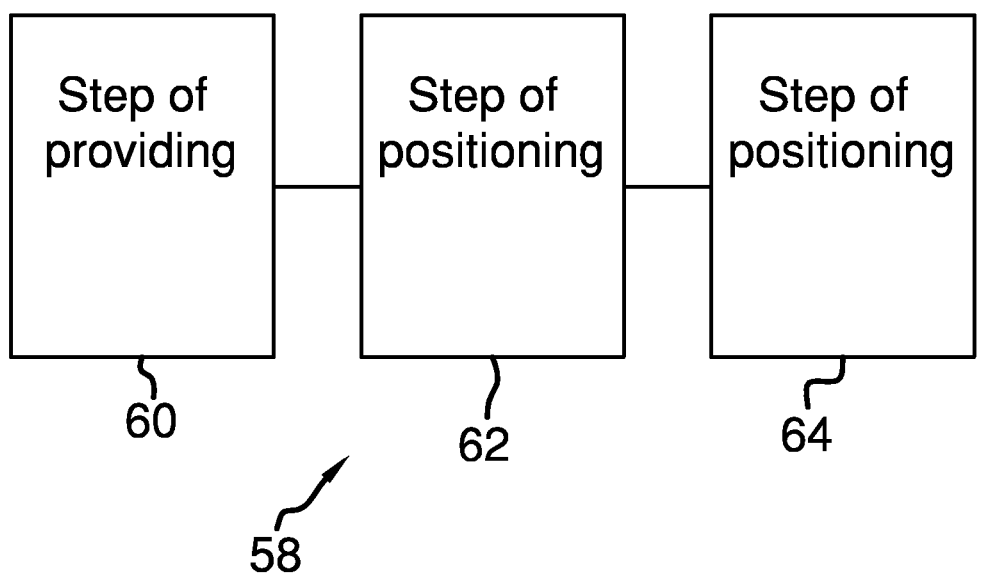
FIG. 6 is a schematic view of a method of utilizing an embodiment of the disclosure.

With reference now to the drawings, and in particular to FIGS. 1 through 6 thereof, a new cushion device embodying the principles and concepts of an embodiment of the disclosure and generally designated by the reference numeral 10 will be described.

As best illustrated in FIGS. 1 through 6, the bodily cushion assembly 10 generally comprises a pad 12 that has an outer edge 14 extending between each of a top surface 16 and a bottom surface 18 of the pad 12. The pad 12 is positionable on a chair 20. The bottom surface 18 of the pad 12 abuts the chair 20. A top side 22 of the outer edge 14 of the pad 12 is positioned proximate an upper end 24 of a backrest 26 of the chair 20. A bottom side 28 of the outer edge 14 of the pad 12 is positioned proximate a front end 30 of a seat 32 of the chair 20. The chair 20 may be a reclining chair of any conventional design.

A plurality of bolsters 34 is provided. Each of the plurality of bolsters 34 has an outer wall 36 extending between each of a first end 38 and a second end 40 of each of the plurality of bolsters 34. The outer wall 36 of each of the plurality of bolsters 34 is curvilinear. Each of the plurality of bolsters 34 has a cylindrical shape. Additionally, the plurality of bolsters 34 may each be comprised of a resiliently compressible material.

A first one 42 of the plurality of bolsters 34 is coupled to the top surface 16 of the pad 12 proximate a first lateral side 44 of the outer edge 14 of the pad 12. The first bolster 42 extends between the top 22 and bottom 28 sides of the outer edge 14 of the pad 12. A second one 46 of the plurality of bolsters 34 is coupled to the top surface 16 of the pad 12 proximate a second lateral side 48 of the outer edge 14 of the pad 12. The second bolster 46 extends between the top 22 and bottom 28 sides of the outer edge 14 of the pad 12.

A third one 50 of the plurality of bolsters 34 is coupled to the top surface 16 of the pad 12 proximate the top side 22 of the outer edge 14 of the pad 12. The third bolster 50 extends between the first 44 and second 48 lateral sides of the outer edge 14 of the pad 12. A user 52 sits on the top surface 16 of the pad 12. Each of the first 42 and second 46 bolster retains the user's legs 54 and the user's arms 56 on the pad 12.

The pad 12 and the plurality of bolsters 34 prevents the user 52 from developing bruises or sores while sitting in the chair 20. Additionally, the pad 12 and plurality of bolsters 34 allows the user 52 to be re-positioned in the chair 20 without developing abrasions. The user 52 may be an elderly or otherwise infirm individual.

In use, a method 58 of preventing the user 52 from developing sores or bruises while sitting in the chair 20 includes a step 60 of providing the pad 12 has the top 16 and bottom 18 surfaces and the plurality of bolsters 34 each coupled to an associated one of the first lateral side 44, the second lateral side 48 and the top side 22 of the outer edge 14 of the pad 12. The method 58 additionally includes a step 62 of positioning the pad 12 on the chair 20 so the bottom surface 18 of the pad 12 abuts the chair 20. The pad 12 extends between the upper end 24 of the backrest 26 of the chair 20 and the front end 30 of the seat 32 of the chair 20. Finally, the method 58 includes a step 64 of positioning the user 52 on the pad 12 so the user 52 sits on the top surface 16 of the pad 12. The plurality of bolsters 34 retains the user's arms 54 and legs 52 on the pad 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A bodily cushion assembly comprising:
   a chair having a backrest, a seat, and a pair of arms;

a pad positionable on the chair allowing a user to sit on said pad after said pad is positioned on the chair; and a plurality of bolsters coupled to an outer edge of said pad such that said plurality of bolsters is configured to retain the user's arms and legs on said pad, a first one of said plurality of bolsters being coupled to and extending continuously along a full length of a first lateral side of an outer edge of said pad such that said first bolster extends between a top side and a bottom side of said outer edge of said pad, a second one of said plurality of bolsters being coupled to and extending continuously along a full length of a second lateral side of an outer edge of said pad such that said second bolster extends between a top side and a bottom side of said outer edge of said pad, said first one of said bolsters and said second one of said bolsters abutting an associated one of said arms wherein said first one of said bolsters and said second one of said bolsters are each configured for inhibiting bodily contact with said arms by the user.

2. The assembly according to claim 1, further comprising said pad having an outer edge extending between each of a top surface and a bottom surface of said pad.

3. The assembly according to claim 1, further comprising each of said plurality of bolsters having an outer wall extending between each of a first end and a second end of said plurality of bolsters.

4. The assembly according to claim 1, further comprising a third one of said plurality of bolsters being coupled to a top side of an outer edge of said pad such that said third bolster extends between a first lateral side and a second lateral side of said outer edge of said pad.

5. The assembly according to claim 1, further comprising said pad being positionable on the chair such that a bottom surface of said pad abuts the chair.

6. The assembly according to claim 5, further comprising having a top side of an outer edge of said pad being positioned proximate an upper end of a backrest of the chair and a bottom side of said outer edge of said pad being positioned proximate a front end of a seat of the chair.

7. A bodily cushion assembly comprising:

a chair having a backrest, a seat, and a pair of arms;

a pad having an outer edge extending between each of a top surface and a bottom surface of said pad, said pad being positionable on the chair such that said bottom surface of said pad abuts the chair having a top side of said outer edge of said pad being positioned proximate an upper end of the backrest of the chair and a bottom side of said outer edge of said pad being positioned proximate a front end of the seat of the chair;

a plurality of bolsters each having an outer wall extending between each of a first end and a second end of each of said plurality of bolsters;

a first one of said plurality of bolsters being coupled to and extending continuously along a full length of a first lateral side of said outer edge of said pad such that said first bolster extends between said top and bottom sides of said outer edge of said pad;

a second one of said plurality of bolsters being coupled to and extending continuously along a full length of a second lateral side of said outer edge of said pad such that said second bolster extends between said top and bottom sides of said outer edge of said pad, said first one of said bolsters and said second one of said bolsters abutting an associated one of said arms wherein said first one of said bolsters and said second one of said bolsters are each configured for inhibiting bodily contact with said arms by a user; and a third one of said plurality of bolsters being coupled to said top side of said outer edge of said pad such that said third bolster extends between said first and second lateral sides of said outer edge of said pad.

\* \* \* \* \*